US012631956B2

(12) United States Patent
Liu

(10) Patent No.: US 12,631,956 B2
(45) Date of Patent: May 19, 2026

(54) MASK FABRICATION EFFECTS IN THREE-DIMENSIONAL MASK SIMULATIONS USING FEATURE IMAGES

(71) Applicant: Synopsys, Inc., Mountain View, CA (US)

(72) Inventor: Peng Liu, Cupertino, CA (US)

(73) Assignee: Synopsys, Inc., Sunnyvale, CA (US)

( * ) Notice: Subject to any disclaimer, the term of this patent is extended or adjusted under 35 U.S.C. 154(b) by 836 days.

(21) Appl. No.: 17/956,550

(22) Filed: Sep. 29, 2022

(65) Prior Publication Data

US 2023/0104510 A1     Apr. 6, 2023

Related U.S. Application Data

(60) Provisional application No. 63/251,477, filed on Oct. 1, 2021.

(51) Int. Cl.
| | |
|---|---|
| *G03F 1/36* | (2012.01) |
| *G03F 1/70* | (2012.01) |
| *G03F 7/00* | (2006.01) |
| *G06F 30/27* | (2020.01) |
| *G06F 30/30* | (2020.01) |
| *G06F 30/398* | (2020.01) |
| *G06F 119/18* | (2020.01) |

(52) U.S. Cl.
CPC ................. *G03F 1/70* (2013.01); *G03F 1/36* (2013.01); *G03F 7/70283* (2013.01); *G03F 7/70441* (2013.01); *G03F 7/705* (2013.01); *G03F 7/706841* (2023.05); *G06F 30/27*

(2020.01); *G06F 30/30* (2020.01); *G06F 30/398* (2020.01); *G06F 2119/18* (2020.01)

(58) Field of Classification Search
None
See application file for complete search history.

(56) References Cited

U.S. PATENT DOCUMENTS

| | | |
|---|---|---|
| 7,587,704 B2 | 9/2009 | Ye et al. |
| 7,703,069 B1 | 4/2010 | Liu et al. |
| | (Continued) | |

FOREIGN PATENT DOCUMENTS

| | | |
|---|---|---|
| CN | 105074575 A | 11/2015 |
| EP | 1465016 A2 | 10/2004 |
| | (Continued) | |

OTHER PUBLICATIONS

Liu, P. "Accurate Prediction of 3D Mask Topography Induced Best Focus Variation in Full-Chip Photolithography Applications." Proceedings of SPIE, Photomask Technology, vol. 8166, Oct. 13, 2011, pp. 1-8.

(Continued)

*Primary Examiner* — Leigh M Garbowski
(74) *Attorney, Agent, or Firm* — Fenwick & West LLP

(57) ABSTRACT
Feature images representing a layout geometry of a lithographic mask are received. Mask function (MF) contributions from individual feature images are calculated by convolving the feature image with a corresponding three-dimensional mask (M3D) filter. The M3D filters represent an electromagnetic scattering effect of that feature image. At least one M3D filter also accounts for effects arising from a fabrication process for the lithographic mask.

19 Claims, 14 Drawing Sheets

(56) References Cited

U.S. PATENT DOCUMENTS

| | | | | |
|---|---|---|---|---|
| 8,918,743 | B1 * | 12/2014 | Yan | G03F 7/70283 |
| | | | | 716/51 |
| 8,938,696 | B1 | 1/2015 | Torunoglu et al. | |
| 9,348,964 | B2 * | 5/2016 | Zhang | G06F 30/398 |
| 10,451,563 | B2 | 10/2019 | Sousa et al. | |
| 11,704,471 | B2 * | 7/2023 | Liu | G03F 1/70 |
| | | | | 716/51 |
| 2014/0195993 | A1 | 7/2014 | Liu et al. | |
| 2015/0378264 | A1 | 12/2015 | Liu | |
| 2017/0147734 | A1 | 5/2017 | Rosenbluth | |
| 2020/0004161 | A1 | 1/2020 | Yu et al. | |
| 2020/0380362 | A1 * | 12/2020 | Cao | G06N 3/09 |
| 2021/0064811 | A1 | 3/2021 | Liu et al. | |
| 2021/0397080 | A1 | 12/2021 | Yeo | |
| 2022/0082932 | A1 * | 3/2022 | Liu | G03F 1/36 |
| 2022/0100935 | A1 | 3/2022 | Chen | |
| 2023/0079453 | A1 * | 3/2023 | Liu | G03F 7/705 |
| | | | | 430/5 |

FOREIGN PATENT DOCUMENTS

| | | | |
|---|---|---|---|
| JP | 2009-204823 A | 9/2009 | |
| JP | 2010-176144 A | 8/2010 | |
| JP | 2015-513208 A | 4/2015 | |
| JP | 2016-507786 A | 3/2016 | |
| KR | 10-2014-0101814 A | 8/2014 | |
| KR | 10-2015-0124967 A | 11/2015 | |
| TW | 201921095 A | 6/2019 | |
| TW | 202043909 A | 12/2020 | |
| WO | WO 2013/079316 A2 | 6/2013 | |
| WO | WO 2014/127985 A1 | 8/2014 | |
| WO | WO 2019/162346 A1 | 8/2019 | |
| WO | WO 2021/091838 A1 | 5/2021 | |

OTHER PUBLICATIONS

Liu, P. et al. "Fast 3D Thick Mask Model for Full-Chip EUVL Simulations." Proceedings of SPIE, Extreme Ultraviolet (EUV) Lithography IV, vol. 8679, Apr. 1, 2013, pp. 1-16.

Liu, P. et al. "Fast and Accurate 3D Mask Model for Full-Chip OPC and Verification." Proceedings of SPIE, vol. 6520, Mar. 26, 2007, pp. 1-12.

PCT International Search Report and Written Opinion, PCT Application No. PCT/US2021/048761, Dec. 22, 2021, 11 pages.

PCT International Search Report and Written Opinion, PCT Application No. PCT/US2022/045380, Feb. 6, 2023, 13 pages.

Zhang, H. et al. "An Accurate ILT-Enabling Full-Chip Mask 3D Model for All-Angle Patterns." SPIE Photomask Technology, vol. 8880, Sep. 9, 2013, pp. 1-10.

China National Intellectual Property Administration, Office Action, Chinese Patent Application No. 202180063270.5, Oct. 28, 2025, 24 pages.

Japan Patent Office, Office Action, Japanese Patent Application No. 2023-517378, Feb. 17, 2025, nine pages.

Taiwan Intellectual Property Office, Office Action, Taiwanese Patent Application No. 110134568, Jun. 6, 2025, 22 pages.

United States Office Action, U.S. Appl. No. 17/897,529, filed May 19, 2025, 13 pages.

Taiwan Intellectual Property Office, Office Action, Taiwanese Patent Application No. 111137552, Feb. 13, 2026, 18 pages.

* cited by examiner

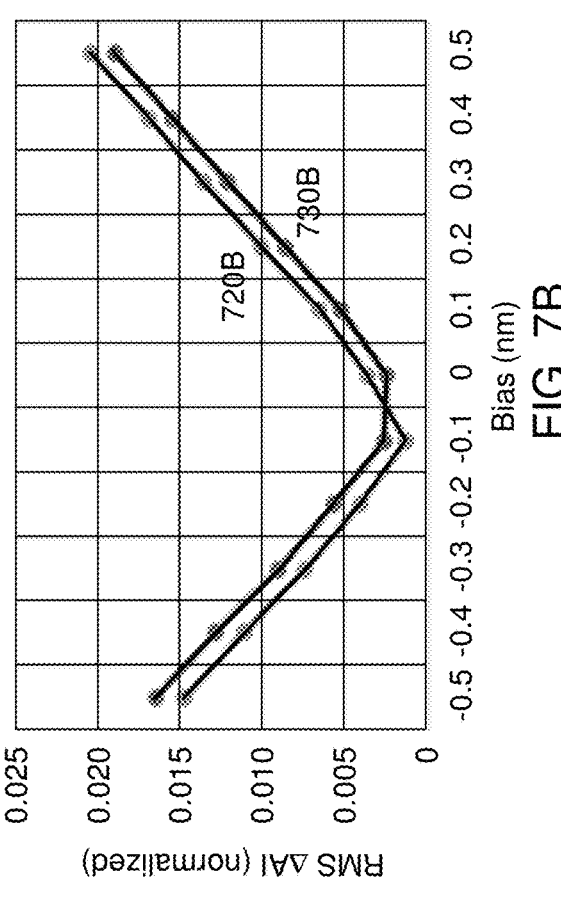
FIG. 7B
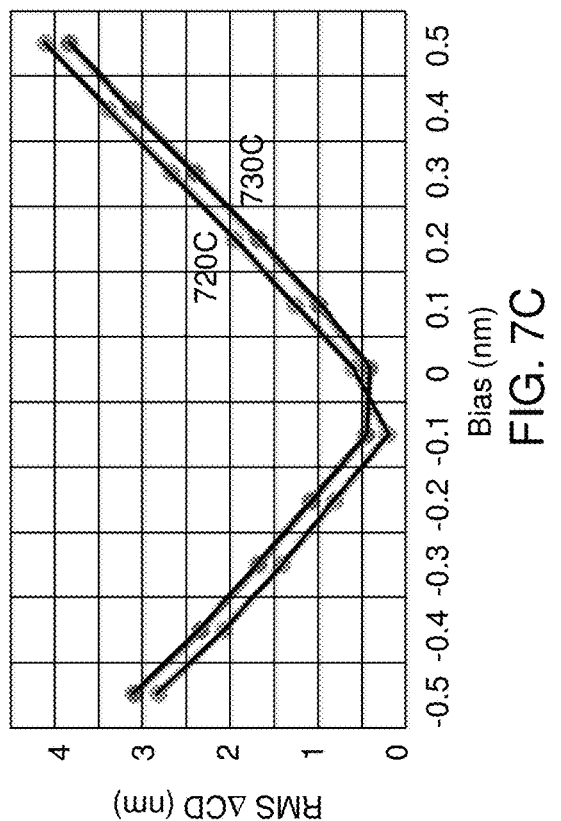
FIG. 7C
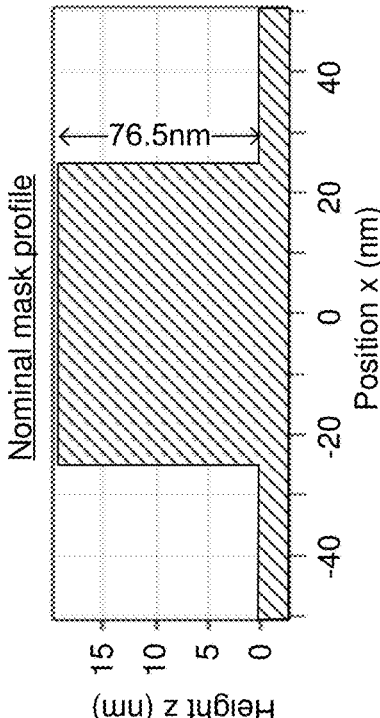
FIG. 7A
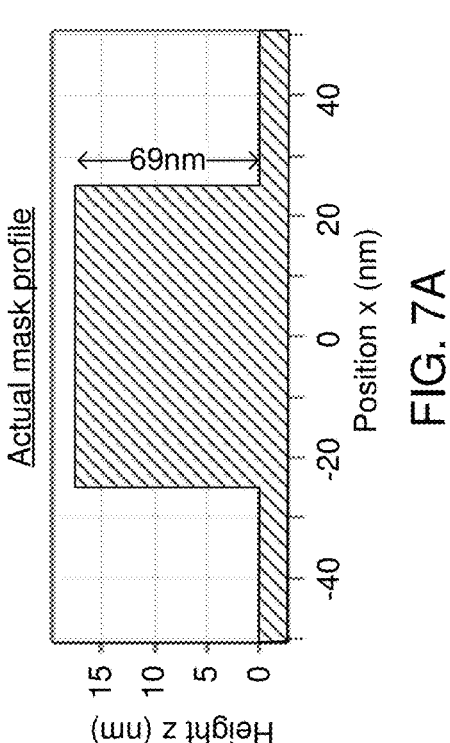

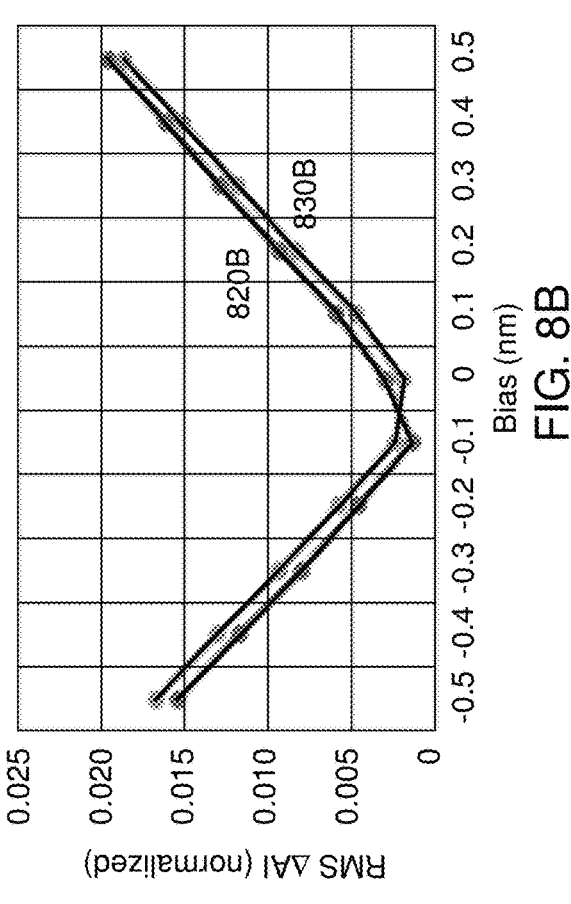
FIG. 8B
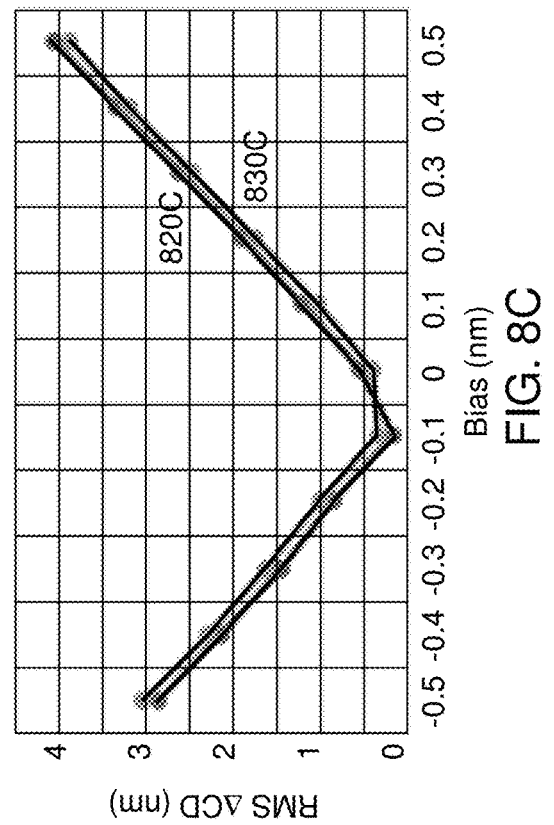
FIG. 8C
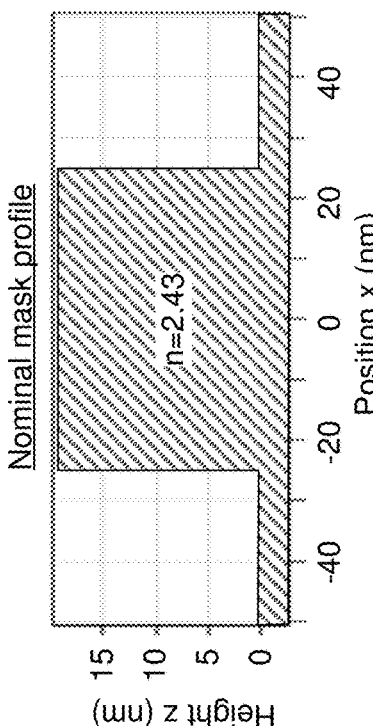
FIG. 8A
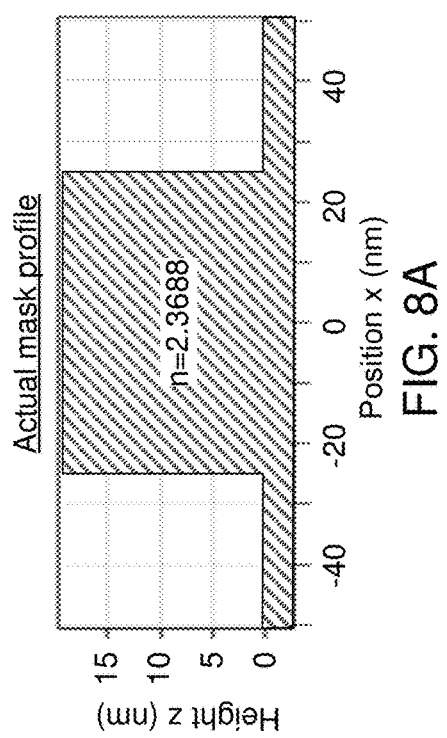

MASK FABRICATION EFFECTS IN THREE-DIMENSIONAL MASK SIMULATIONS USING FEATURE IMAGES

RELATED APPLICATION

This application claims priority under 35 U.S.C. § 119(e) to U.S. Provisional Patent Application Ser. No. 63/251,477, "Mask Fabrication Effects in Lithography Simulations," filed Oct. 1, 2021. The subject matter of all of the foregoing is incorporated herein by reference in their entirety.

TECHNICAL FIELD

The present disclosure relates to lithographic mask simulations, including for full-chip or large-scale computational lithography applications.

BACKGROUND

One step in the manufacture of semiconductor wafers involves lithography. In a typical lithography process, a source produces light that is collected and directed by collection/illumination optics to illuminate a lithographic mask. Projection optics relay the pattern produced by the illuminated mask onto a wafer, exposing resist on the wafer according to the illumination pattern. The patterned resist is then used in a process to fabricate structures on the wafer.

Various technologies are directed to improving the lithography process, including the design of the lithographic mask. In computational lithography, the lithographic mask design is used as an input to a three-dimensional mask model, which is used to compute a mask function that describes the electromagnetic field scattering characteristics of the mask illuminated by the light source. The mask function may then be used as input to an optical imaging model (e.g., Abbe imaging model or Hopkins imaging model) to predict the printed pattern in resist. It is desirable that the three-dimensional mask model is accurate as well as fast.

SUMMARY

In certain aspects, feature images representing a layout geometry of a lithographic mask are received. Mask function (MF) contributions from individual feature images are calculated by convolving the feature image with a corresponding three-dimensional mask (M3D) filter. The M3D filters represent an electromagnetic scattering effect of that feature image. At least one M3D filter is an M3D filter that also accounts for effects arising from a fabrication process for the lithographic mask.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIGS. 7A-7C depict adjusting M3D filters for variation in mask thickness according to embodiments of the present disclosure.

FIGS. 8A-8C depict adjusting M3D filters for variation in mask material properties according to embodiments of the present disclosure.

DETAILED DESCRIPTION

Figure 1A:
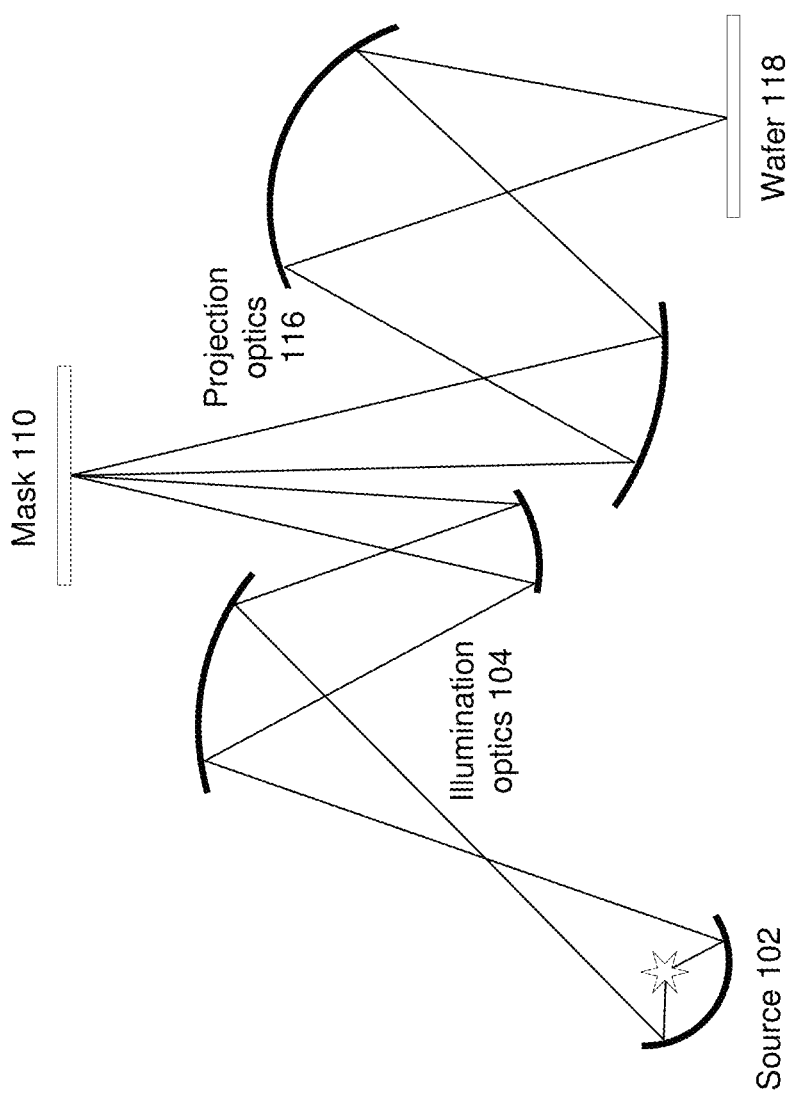
FIG. 1A depicts an extreme ultraviolet (EUV) lithography process suitable for use with embodiments of the present disclosure.

Aspects of the present disclosure relate to three-dimensional mask simulations based on feature images. The illumination pattern that exposes resist on a wafer depends on the geometric layout of the lithographic mask and the source illumination, among other factors. Simulation of the lithographic process depends on an accurate prediction of the electromagnetic field produced by the source illumination incident on the lithographic mask. This field may be predicted using rigorous, three-dimensional simulations of Maxwell's equations, accounting for diffraction and scattering effects. However, such simulations are computationally intensive and have long run times. As a result, in many cases, it is prohibitive to run rigorous three-dimensional simulations for the mask area covering an entire chip.

Aspects of the present disclosure relate to calculating the electromagnetic field diffraction and scattering characteristics, as represented by a mask function (MF), by using a set of feature images (a.k.a. feature vectors) and corresponding filters (referred to as mask three-dimensional (3D) or M3D filters), some of which are modified to account for effects from the mask fabrication process. The feature images represent basic geometries that may be present in the mask, and the corresponding M3D filters represent the scattering effects resulting from the feature images. The M3D filters may be determined based on rigorous electromagnetic simulation of the scattering effects of the feature images given the source illumination.

In one approach, the features images are selected from a library of predefined feature images and their corresponding precalculated mask 3D (M3D) filters. The feature images in the library include, but are not limited to, the following:

0-edge feature images: bulk area (no edges)

1-edge feature images: edges of different orientations 2-edge feature images: combinations of two edges with different orientations and spatial relations relative to each other 3+ edge feature images: combinations of three or more edges (e.g., polygon shapes)

In many cases, the actual layout geometry of the lithographic mask will include effects resulting from the mask fabrication process. For example, certain mask features may be reflective stacks constructed from layers of materials. The stacks may not have perfectly vertical sidewalls. The thicknesses of the layers may not exactly match the nominal design values. The material properties also may not exactly match the nominal design values.

However, in some lithography simulations, the topography of the lithographic mask may be represented by an idealized model that does not take into account the limitations and resulting effects of the mask making process. As a result, lithography simulations that assume idealized topographies may be less accurate than desired.

In other approaches to simulation, accurate estimation of these effects requires complex models, for example detailed three-dimensional models of the mask feature and fully rigorous three-dimensional solution of Maxwell's equations for the scattering from the feature. However, this can be computationally complex, requiring significant compute resources and long runtimes.

In the approaches described herein, the M3D filters are modified to account for effects arising from the mask fabrication process. The M3D filters may be parameterized to provide additional degrees of freedom to account for these effects. Examples of parameters include a spatial shift or biasing of the M3D filter, and additive and multiplicative constants for terms in the filter. In some cases, the values of these parameters are determined based on measurements of wafers fabricated using lithographic masks, where the masks were fabricated using the mask fabrication process.

In additional aspects of the disclosure, the modified M3D filters, which will be referred to as mask-corrected M3D filters, are computed and saved as lookup tables (LUT) or other data structures. These LUTs are re-used in 3D mask simulations, thus accounting for mask fabrication effects. The electromagnetic field diffraction and scattering characteristics, as represented by a mask function (MF), are calculated by using a set of feature images which are convolved with the corresponding mask-corrected M3D filters.

Additional technical advantages of the present disclosure include, but are not limited to, the following. This approach does not create additional layouts for the subsequent simulation flow to process and therefore improves simulation runtime compared to alternative approaches. It may be more suitable for use with both machine learning (ML) and non-ML frameworks as well as for graphics processing units (GPU). Compared to the full rigorous simulation, the approach is more computationally efficient for model creation, training and calibration and runtime is also reduced, while still producing accurate results for the mask function. The resulting mask function may also be used efficiently in both Hopkins and Abbe imaging models, which may be the next steps in the lithography simulation.

In more detail, FIG. 1A depicts an EUV lithography process suitable for use with embodiments of the present disclosure. In this system, a source 102 produces EUV light that is collected and directed by collection/illumination optics 104 to illuminate a mask 110. Projection optics 116 relay the pattern produced by the illuminated mask 110 onto a wafer 118, exposing resist on the wafer according to the illumination pattern. The exposed resist is then developed, producing patterned resist on the wafer. This is used to fabricate structures on the wafer, for example through deposition, doping, etching or other processes.

In FIG. 1A, the light is in the EUV wavelength range, around 13.5 nm or in the range 13.3-13.7 nm. At these wavelengths, the components may be reflective, rather than transmissive. The mask 110 is a reflective mask, that may be implemented as a stack of different materials, and the optics 104, 116 are also reflective and off-axis. This is just an example. Other types of lithography systems may also be used, including at other wavelengths including deep ultra-violet (DUV), using transmissive masks and/or optics, and using positive or negative resist.

Figure 1B:
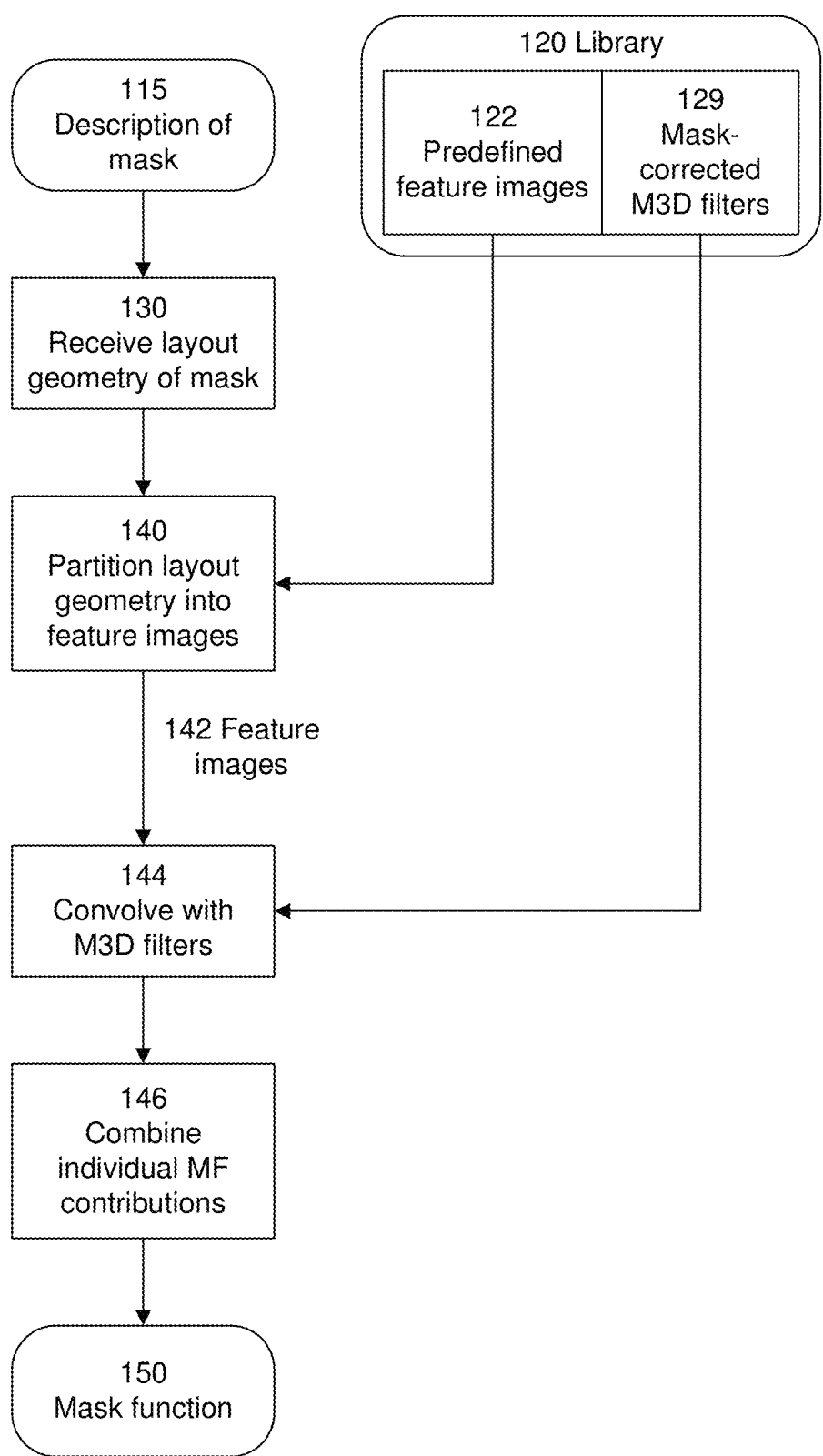
FIG. 1B is a flowchart for calculating scattering from a mask according to embodiments of the present disclosure.

FIG. 1B is a flowchart for calculating scattering from a mask 110, taking into account effects from the mask fabrication process. The diffraction and scattering from the mask 110 is represented by a mask function (MF) 150. The process of FIG. 1B uses a description 115 of the mask and a library 120 to determine the mask function 150 for the mask. The library contains feature images 122 (e.g., predefined feature images) and corresponding filters 129, which will be referred to as mask 3D (M3D) filters because they represent the contribution to the overall mask function from that type of feature image for a given source illumination. The M3D filters 129 include effects of the source illumination and have been adjusted to account for mask fabrication effects, as described in more detail herein.

As shown in FIG. 1B, the layout geometry of the mask is received at 130 and partitioned into feature images 142, based on the feature images 122 from library 120 at 140. The mask function (MF) contribution from each feature image 142 is calculated by convolving the feature image 142 with the corresponding M3D filter 129 at 144. The aggregate mask function for the mask and given source illumination is determined by combining (e.g., summing) the MF contributions from the individual feature images at 146.

The mask function may then be used in various design flows. The mask function may be used to estimate a result of a lithography process, such as an aerial image or a printed mask pattern produced by the lithographic mask. Mask correction may then be applied to the design of the lithographic mask based on the estimated result. Examples of mask correction include optical proximity correction, sub-resolution assist features, phase shifting masks, inverse lithography techniques, and source mask optimization.

Figure 1C:
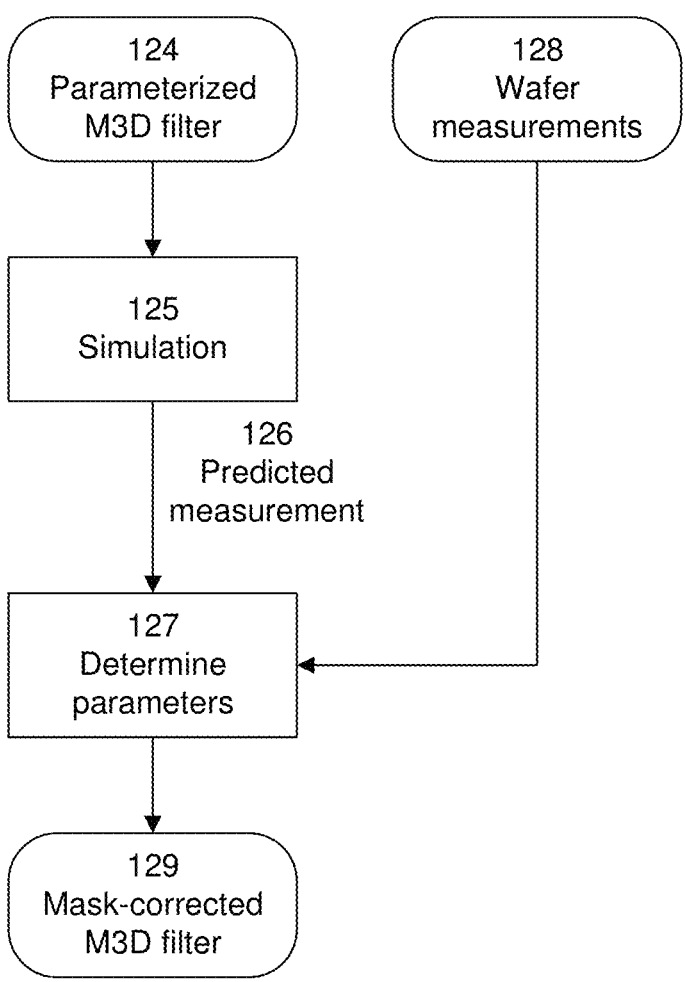
FIG. 1C is a flowchart for adjusting M3D filters to account for mask fabrication effects according to embodiments of the present disclosure.

FIG. 1C is a flowchart for developing mask-corrected M3D filters 129. Uncorrected M3D filters may be developed as described below in FIGS. 2-4. These filters may be parameterized to add more degrees of freedom to account for mask fabrication effects. At 127 of FIG. 1C, the values of the parameters are determined by comparing predictions of simulations at 125 against measurements of actual wafers at 128. For example, wafers may be fabricated using lithographic masks, where the masks are fabricated by the mask fabrication process. Various measurements may be made, for example widths or spacings of features printed on the wafer. The M3D filters may be used in simulations to predict the same measurements 126. The parameters may be determined at 127 based on reducing the difference between the predicted measurement 126 and the actual measurement 128, resulting in the mask-corrected M3D filter at 129. In this example, the wafer measurements 128 are used as the ground truth to directly calibrate the parameterized M3D filters 124.

In an alternate approach, wafer measurements 128 may be used to generate a ground truth which is then used to calibrate the parameterized M3D filters 124. For example, rather than directly measuring line widths or other physical metrics, the three-dimensional profile of features on the wafer may be measured. These can then be used as input to an accurate simulation, which predicts the line width. Alternatively, the measured three-dimensional profile on the wafer may be used to directly calibrate the parameterized M3D filters 124 using a model that relates the two. Measurements of the lithographic mask itself, in addition to or in place of measurements of the wafer, may also be used.

Figure 1D:
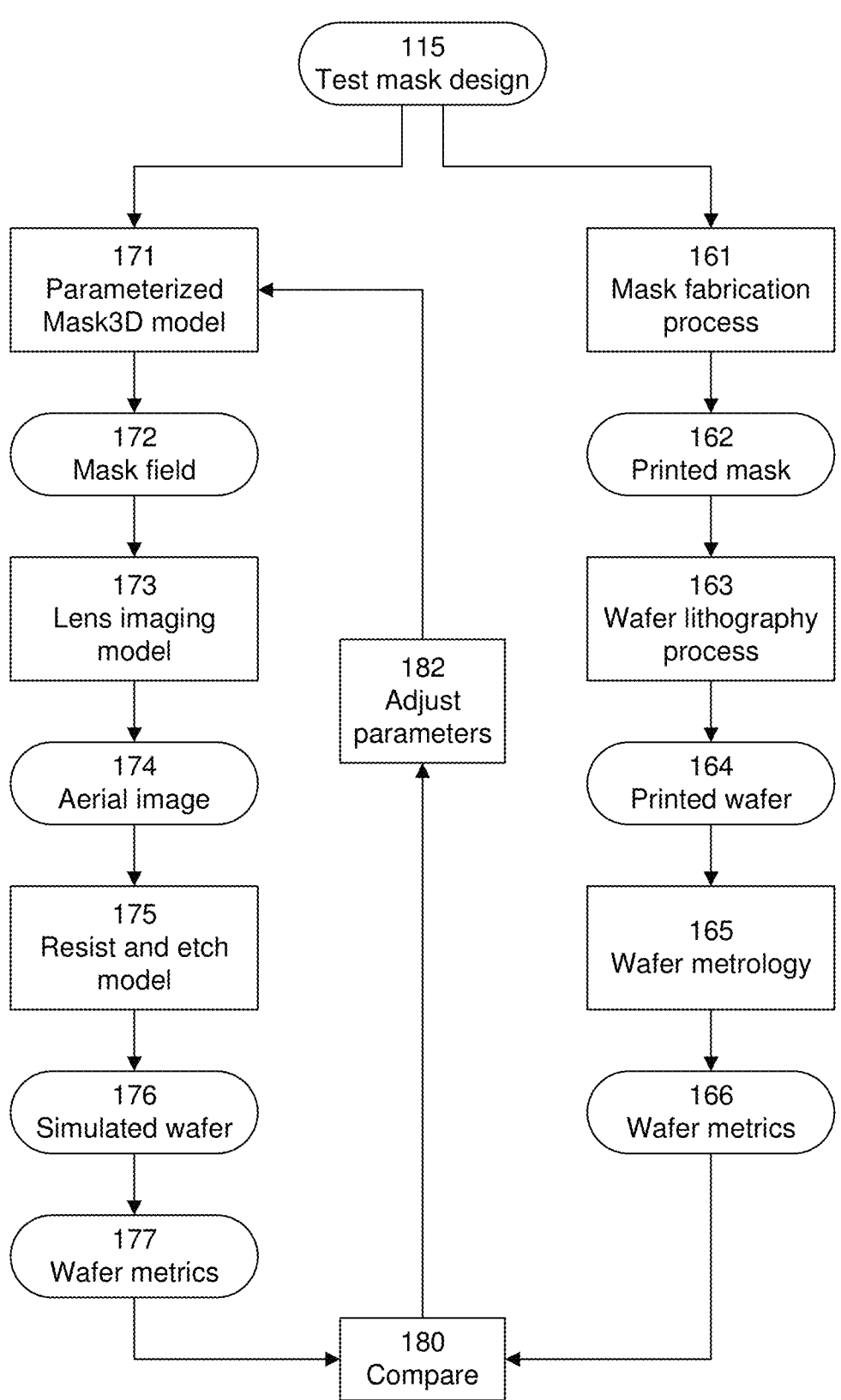
FIG. 1D is another flowchart for adjusting M3D filters to account for mask fabrication effects according to embodiments of the present disclosure.

FIG. 1D is another flowchart for adjusting M3D filters to account for mask fabrication effects according to embodiments of the disclosure. The righthand side shows the fabrication of physical wafers 164 based on a test mask design 115. The lefthand side shows simulation of the same process. In the physical fabrication flow, the test mask design 115 is first used in the mask fabrication process 161 to produce a printed mask (physical mask) 162. The physical lithographic mask is then used in a lithography process 163 to fabricate the printed wafer (physical wafer) 164. Various metrics 166 of the wafer may then be measured at 165, such as sizes of various features.

In the simulation flow, the test mask design 115 is used as input to a simulation that predicts the wafer characteristics that were measured in the physical fabrication flow. The tunable M3D model 171, using feature images and parameterized M3D filters, predicts the diffracted mask field or mask function 172. This step accounts for the source illumination and mask fabrication effects. This result is propagated through a lens imaging model 173 to predict the aerial image 174 in resist on the wafer. A resist and etch model 175 is used to predict the fabricated wafer 176, from which the same wafer metrics 177 may be estimated.

At 180, comparison of the measured wafer metrics 166 to the simulated predictions of the same metrics 177 is used to tune 182 the parameters for M3D filters. This feedback may also be used to adjust the other models in the simulation flow.

Figure 2:
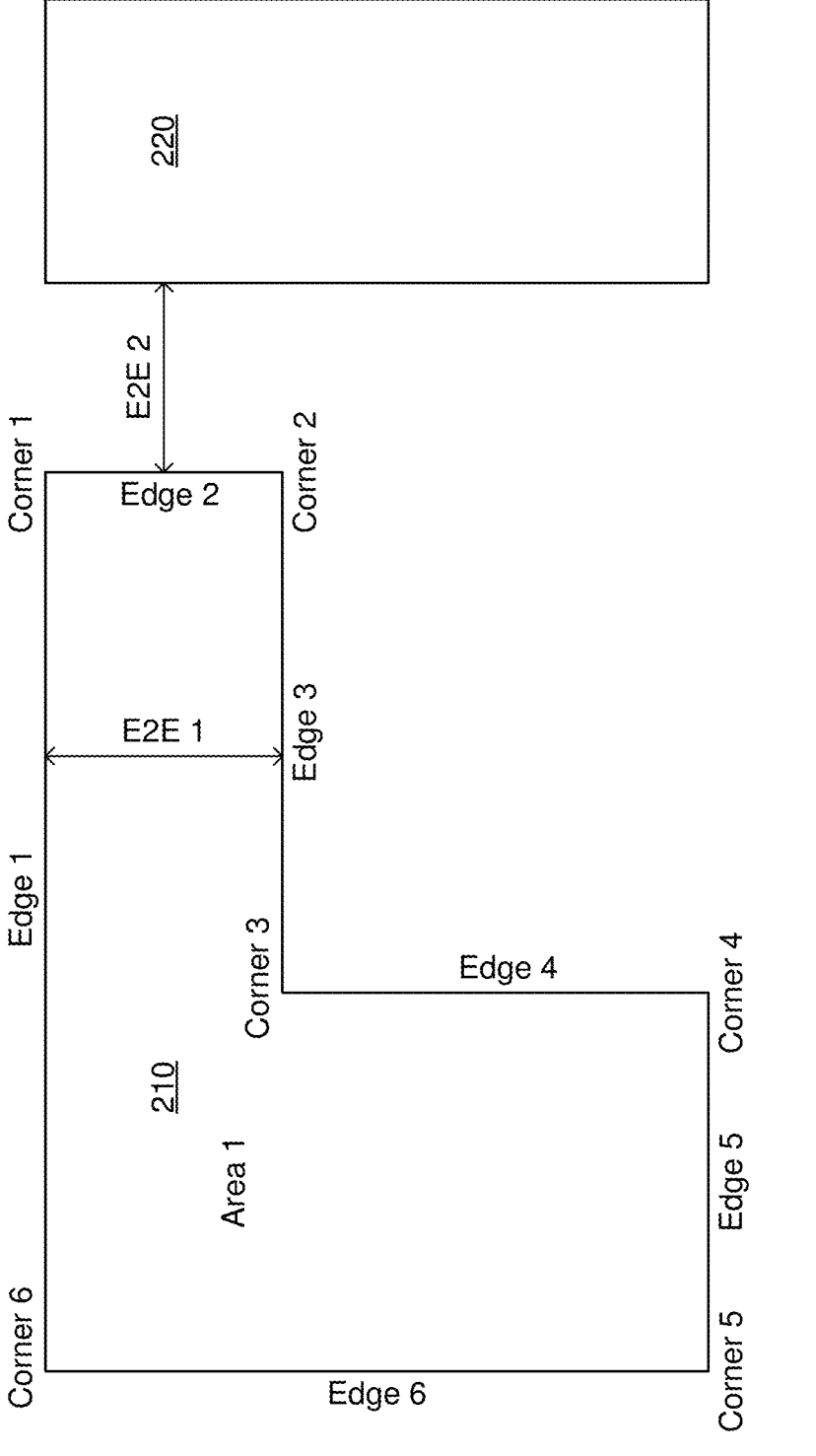
FIG. 2 depicts partitioning a mask layout geometry into feature images according to embodiments of the present disclosure.
Figure 3:
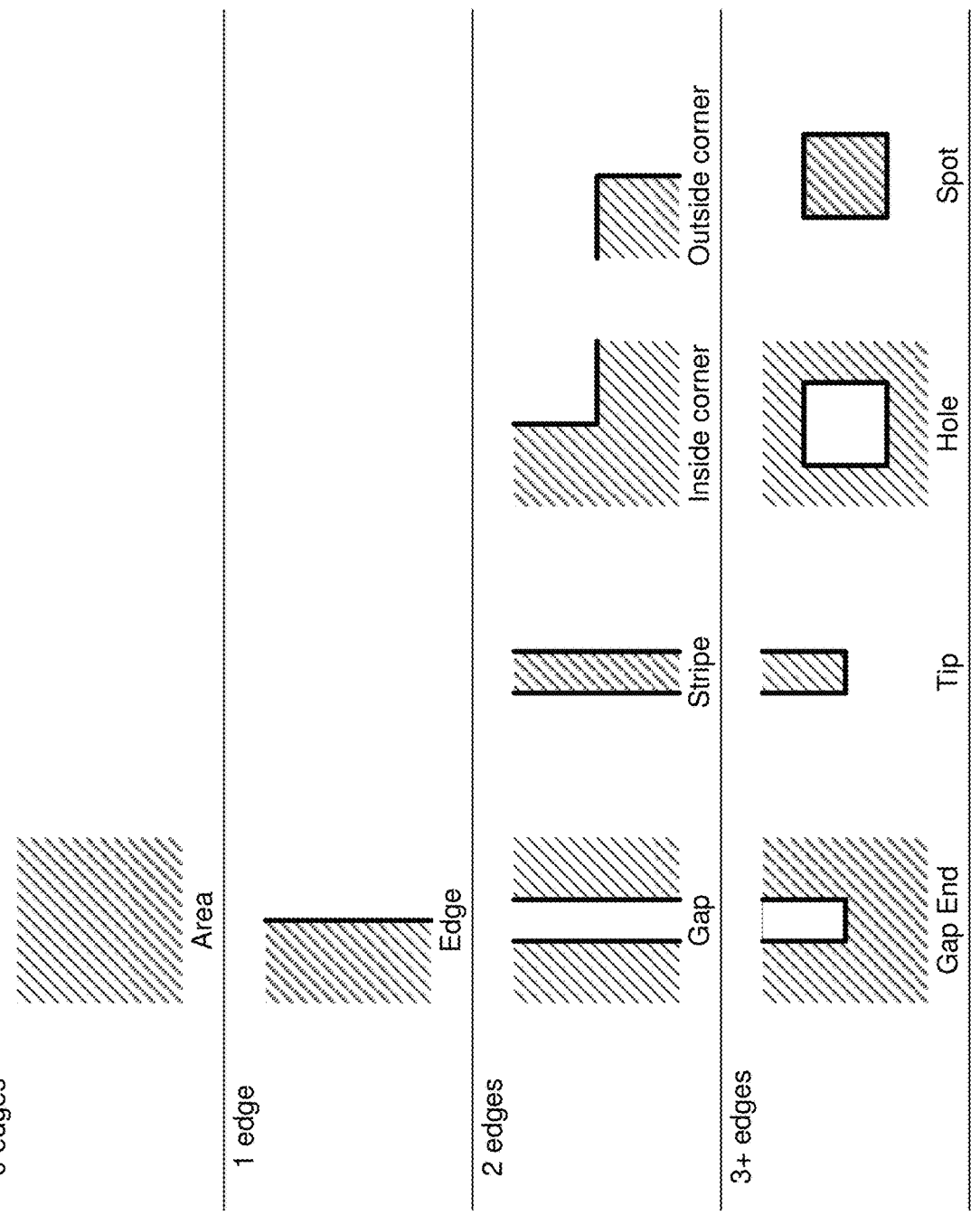
FIG. 3 depicts feature images in a library according to embodiments of the present disclosure.

FIGS. 2-4 first describe the use of feature images without correction for mask fabrication effects. FIG. 2 depicts partitioning a mask layout geometry into feature images. FIG. 2 shows two shapes 210 and 220 and the partitioning of shape 210 into features images. Shape 210 is partitioned into the following features images: one area image, six edge images, six corner images, and two edge-to-edge (E2E) images. The shape 210 may be partitioned into the feature images based on rules to identify different features present in the mask layout. In this example, the interior area of the polygon shape 210 and its contribution to the mask function is represented by the Area 1 feature image. This defines which areas of the mask are opaque versus transmissive or reflective. The edge feature images (Edge 1-Edge 6) account for diffraction and scattering of the electromagnetic wave at edges.

The remaining feature images are based on combinations of two edges, where there will be interaction between the two edges. The corner feature images (Corner 1-Corner 6) account for interactions at corners, which is beyond just the individual contributions of the two edges. Note that in FIG. 2, the corners include both inside corners and outside corners. The edge-to-edge (E2E) feature images account for interactions between parallel edges. E2E 1 accounts for interactions between Edges 1 and 3. E2E 2 accounts for interactions between Edge 2 and the left edge of shape 220.

Each of the feature images is an image. For example, the area image may be the polygon of shape 210. Each of the edge images may be a filtered version of the relevant edge. In some cases, rasterization filters are applied to generate the feature images.

The partitioning of the layout geometry uses feature images 122 from library 120. The feature images in the library may be selected based on an understanding of scattering, and what types of geometric features contribute to scattering.

FIG. 3 depicts some examples of feature images in a library. The features images in FIG. 3 are classified according to the number of edges in the feature image. The feature images in the top row have 0 edges, the ones in the next row have 1 edge, and then 2 edges, and then 3+ edges. These are just examples and are not exhaustive.

In the top row, the area feature image determines which areas of the mask are opaque versus transmissive or reflective. Actual instances of the area feature images may have different shapes, sizes and locations, depending on the geometric layout of shapes on the mask. The M3D filter corresponding to the area feature image represents the scattering produced by each point in the area assuming an infinitely large area, i.e., the contribution to the mask function from each point within a bulk area of the geometric layout ignore any edge effects. Hence, the convolution of the M3D filter with an instance of the area feature image (e.g., Area 1 in FIG. 2) yields the MF contribution from the bulk area of that shape in the mask.

In the second row, the edge feature image is another class of feature images, because diffraction or scattering of the electromagnetic wave occurs at edges. FIG. 3 shows one edge feature image, but the library may have many types of edge images. For a mask with only Manhattan geometry, four edge feature images are included in the library, corresponding to the four possible orientations of an edge in the Manhattan geometry. Some masks may also allow edges at multiples of 45 degrees, or even at arbitrary angles. The M3D filter corresponding to the Edge feature image represents the scattering produced by each point along the edge assuming an infinitely long edge.

The third row shows another important class of feature images, which are combinations of two edges. When two edges become close enough, there will be interaction between the two edges. Several examples are shown in FIG. 3. In the first two examples, the two edges are parallel. This is generally referred to as edge-to-edge (labelled E2E in FIG. 2). FIG. 3 shows two different polarities, depending on whether the area between the two edges is filled by mask material or not. In addition to the two different polarities, the library may also contain edge-to-edge feature images with different separations between the edges, and with the edges oriented at different angles (horizontal, vertical, at multiples of 45 degrees, etc.).

In the last two examples of the third row, the two edges are perpendicular to each other. These are corner feature images: an inside corner and an outside corner, depending on the polarity. The library may contain corners oriented at different angles. Other two-edge feature images are also possible. For example, the two edges may be at different angles to each other. The two edges may be separated but not parallel to each other. Thus, the two edges will be slowly converging or diverging. Corners at angles other than 90 degrees are also possible.

The bottom row shows feature images with three or more edges. The first two examples are tips of both polarities. The library may contain versions of different widths and at different angular orientations. The next two examples are holes or vias of both polarities. Different versions may have different widths, heights and angular orientations.

Each of the feature images has a corresponding M3D filter that is used to produce the MF contribution from the feature image. That is, the scattering effects of the feature image are captured by the M3D filter. In one approach, rigorous simulations are performed for the feature images and the rigorous results are used to determine the M3D filters.

The M3D filters may be calculated by starting with lower order effects. The effect of an Area image (0-order feature image) depends only on the transmission or reflection of the area in question. In a rigorous simulation, the mask structure for this feature image is a plane of constant value. The M3D filter is a constant equal to the transmission or reflection computed from the rigorous simulation.

Next consider an edge feature image. An edge in the layout geometry is partitioned into an area feature image plus an edge feature image. The rigorous simulation of edge scattering is then modeled by the MF contribution from the Area feature image plus the MF contribution from the edge feature image. The MF contribution from the Area feature image is already determined, so the mask function contribution from the Edge feature image and the corresponding M3D filter may then be determined.

Figure 4A:
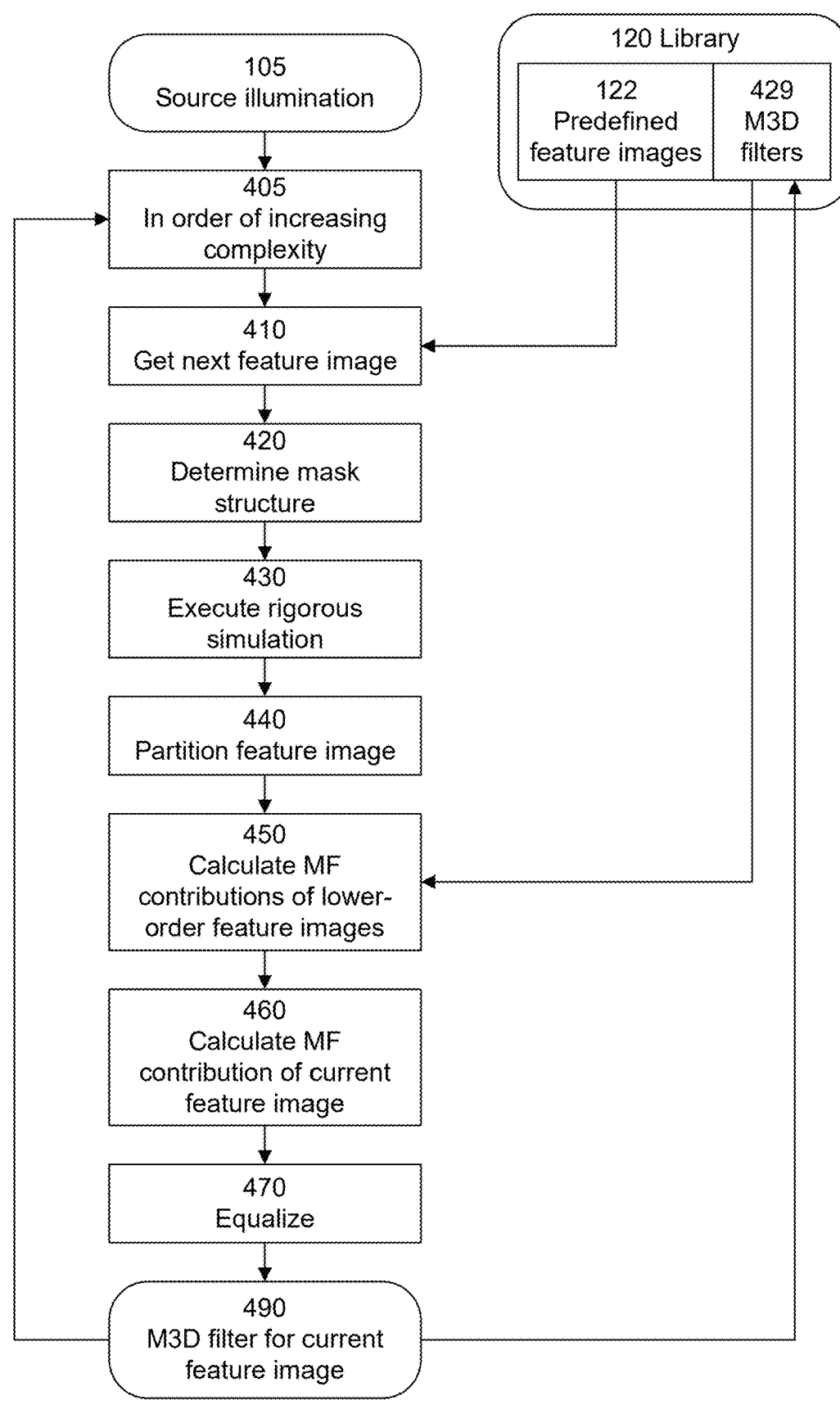
FIG. 4A is a flowchart for calculating an M3D filter for a feature image according to embodiments of the present disclosure.
Figure 4B:
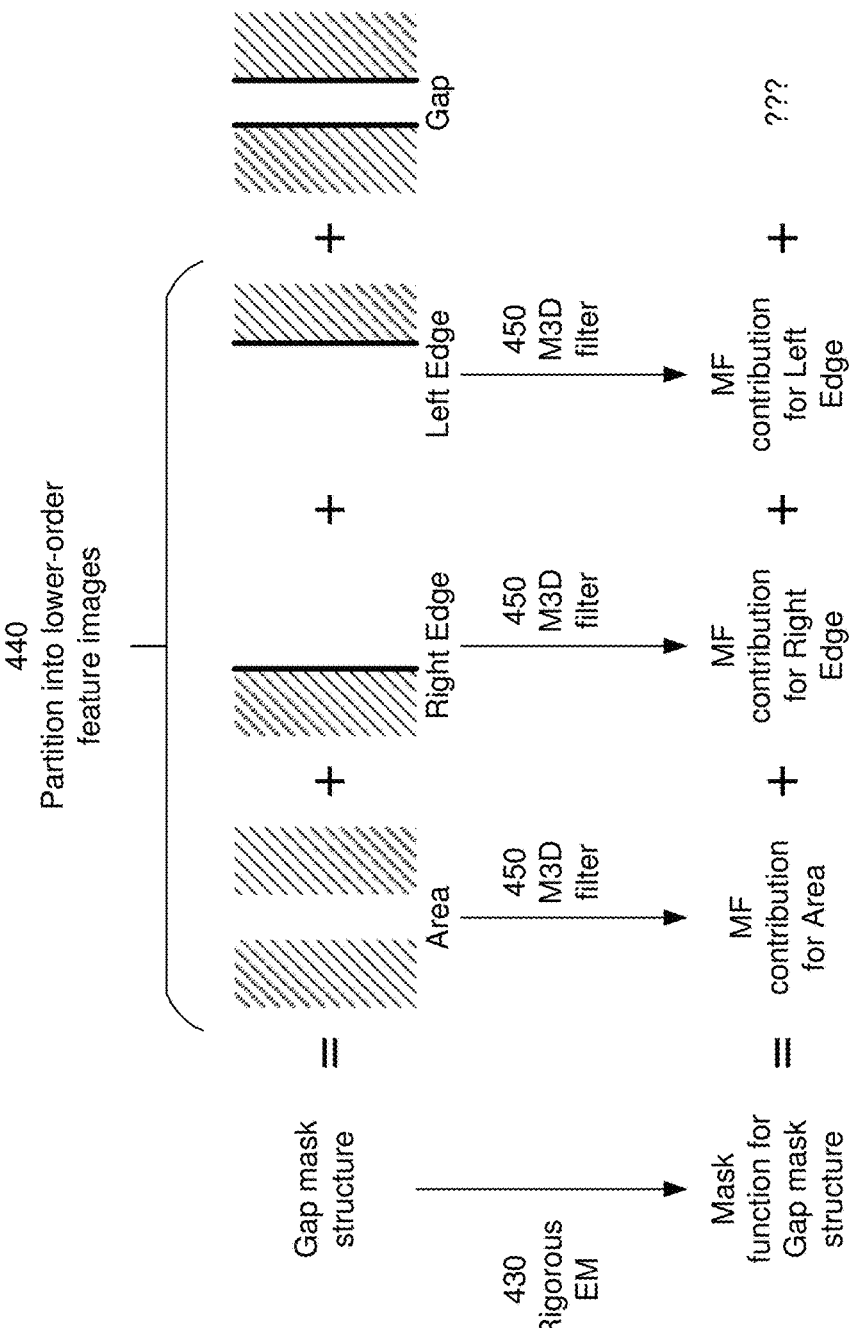
FIG. 4B depicts an example M3D filter calculation according to embodiments of the present disclosure.

After all single-edge feature images are considered, then consider feature images that include two edges. FIG. 4A is a flowchart for calculating M3D filters for feature images, progressing from lower-order to higher-order feature images. FIG. 4B depicts an example M3D filter calculation for the two-edge Gap feature image shown in FIG. 3.

In the example of FIG. 4B, the M3D filters for 0-edge and 1-edge feature images have already been calculated and the process moves 405 to more complex feature images: two-edge feature images. The gap feature image with a specific spacing $\Delta$ is considered next at 410. The mask structure for the gap feature image is determined to be two edges separated by a spacing $\Delta$ at 420. Three-dimensional simulation may be executed 430 for this mask structure, yielding the mask function for this mask structure.

The geometric layout for this mask structure is also partitioned at 440 into lower-order feature images: an area feature image+two edge features images+the gap feature image of interest. This is shown pictorially in the top row of FIG. 4B. The aggregate mask function calculated by rigorous electromagnetic simulation equals the sum of the MF contributions from each feature image:

$$MF = \sum_{i=1}^{N} I_i \otimes K_i \qquad (1)$$

where $I_i$ are the feature images, $K_i$ are the corresponding M3D filters, $\otimes$ is the convolution operator, and N is the number of feature images. MF is the mask function, which in this case is known from the rigorous simulation. The MF contributions for the lower-order feature images may be calculated 450 using the previously calculated M3D filters for those images. This leaves one unknown in Eqn. 1, shown pictorially at the bottom of FIG. 4B. That is the M3D filter for the gap feature image, which may then be calculated 460.

In some cases, this may be used as the M3D filter 429 in the library 120, or as the basis for the parameterized M3D filter 124 in FIG. 1C.

The feature images may be grayscale representations of features, which allow sparse sampling of the images. For example, an edge has infinite frequency components and would require infinite bandwidth to represent with 100% fidelity. However, it may instead be represented by a low-pass filtered version of the edge, which is like a grayscale blurry edge. Polygon shapes in the mask may be rasterized using a low-pass rasterization function. This removes high frequency components of the feature, retaining only the low frequency components. This is acceptable because the projection optics is actually a low pass system, so it will naturally filter out the high (spatial) frequency components. To make it more compact and therefore faster in rasterization operations, the low-pass rasterization filter is designed to have a non-uniform response in the frequency passband as compared to the uniform response of a sinc or sinc-like function. To the extent that the low-pass rasterization function has a non-uniform response in its frequency passband, an equalizing filter 470 may be added to compensate for the non-uniform response. The M3D filter 490 is then a combination of the electromagnetic scattering and the equalization.

The approach described above may be repeated for Gap feature images with different spacings $\Delta$, for example in increments of 1 nm. It may also be repeated for different orientations and polarities. It may also be repeated for other 2-edge and more complex feature images.

Eqn. 1 may be calculated and solved in the spatial domain using direct convolutions. However, it may also be processed in the spatial frequency domain. The quantities are converted to the spatial frequency domain, and the convolution becomes a product. The equivalent equation is then $$FT\{MF\} = \sum_{i=1}^{N} FT\{I_i\}FT\{K_i\} \qquad (2)$$

where FT{ } is the Fourier transform.

Now consider the effects of the mask fabrication process, using the example shown in FIGS. 5-9. These examples are based on the following expression of Eqn. 1:

$$MF = F_{BG} + (F_{FG} - F_{BG})I_{AREA} + \sum I_{EDGE} \otimes K_{EDGE} + \sum I_{E2E} \otimes K_{E2E} \qquad (3)$$

where $I_{AREA}$ is the area feature image and $F_{FG}$ and $F_{BG}$ represent the foreground and background light reflectance/transmittance in bulk areas, which is an expression of the corresponding area M3D filter $K_{AREA}$. The first summation is for edge images, where $I_{EDGE}$ are the edge feature images and $K_{EDGE}$ are the corresponding M3D filters. The second summation is for edge-to-edge (E2E) images, where $I_{E2E}$ are the E2E feature images (with parallel edges) and $K_{E2E}$ are the corresponding M3D filters. The parameterized version of Eqn. 3 is denoted by $$MF = F'_{BG} + (F'_{FG} - F'_{BG})I_{AREA} + \sum I_{EDGE} \otimes K'_{EDGE} + \sum I_{E2E} \otimes K'_{E2E} \qquad (4)$$

where the prime ' indicates that the filters are parameterized versions of the original filters of Eqn. 3.

The following are some possible parameterizations. The Area filters may be parameterized by multiplicative constants $C_{BG}$ and $C_{FG}$:

$$F'_{BG} = C_{BG}F_{BG} \text{ and } F'_{FG} = C_{FG}F_{FG} \quad (5A)$$

Alternatively, additive constants may be used:

$$F'_{BG} = F_{BG} + C_{BG} \text{ and } F'_{FG} = F_{FG} + C_{FG} \quad (5B)$$

The edge and E2E filters may be parameterized by a multiplicative constant C and spatial shift or bias b:

$$K'_{EDGE}(x, y) = C_{EDGE}K_{EDGE}(x - b_{EDGE}, y) \quad (6)$$

$$K'_{E2E}(x, y) = C_{E2E}K_{E2E}(x - b_{E2E}, y) \quad (7)$$

In this example, the shift is in coordinate x, but the shift direction will depend on the orientation of the feature image and M3D filter.

Figure 5:
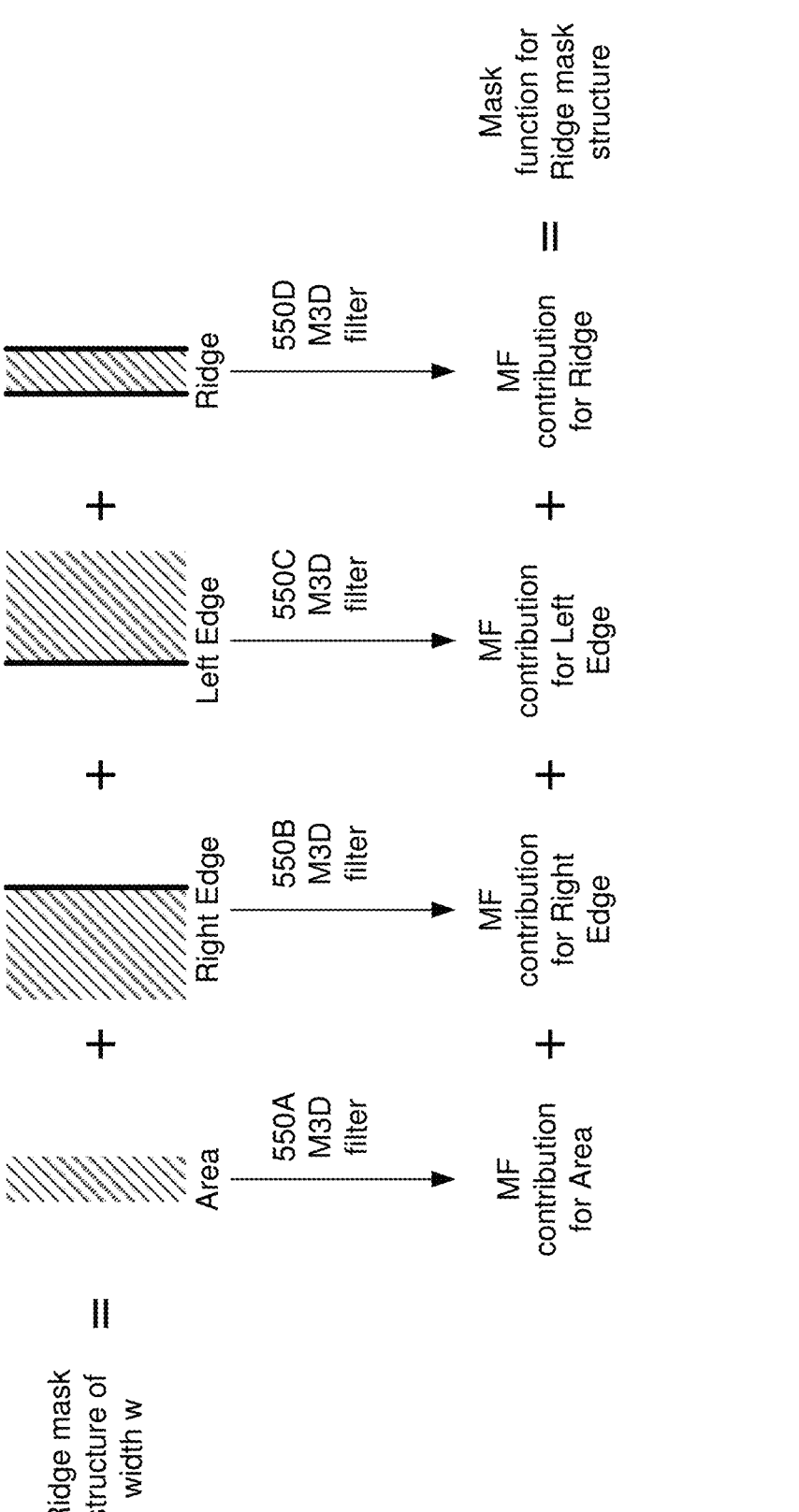
FIG. 5 depicts an example of adjusting M3D filters according to embodiments of the present disclosure.

Changes in higher order features may also affect lower order filters. FIG. 5 shows an example using a ridge feature of width w. In this example, the mask fabrication effects result in a feature that behaves more like a ridge feature with a width of (w+Δ). Assume that this feature is partitioned into four feature images: an area image, a left edge image, a right edge image, and an E2E image as shown in the top row of FIG. 5. These images are not changed. However, th corresponding M3D filters 550A-D are adjusted to account for the difference. For example, the Area M3D filter 550A will be scaled so that when it is applied to the Area image of width w, it produces the scattering prediction of an Area image of width (w+Δ). Similar adjustments are made to the two Edge filters 550B,C and the E2E filter 550D. Note that the shifts b applied to these filters may be different. The mask-corrected contributions from all of the feature images are summed to produce the mask function for the ridge feature, as shown in the bottom row of FIG. 5.

FIGS. 6-9 show examples using four different mask fabrication effects. FIGS. 6A-6C consider variations in the mask sidewall angle. In ideal simulations, sidewall angles of mask features may be assumed to be perfectly vertical (sidewall angle of 90 degrees), as shown in the top mask profile of FIG. 6A. When fabricated, the sidewalls may be sloped, as shown in the bottom mask profile of FIG. 6A. Note that the mask profiles in FIG. 6A are shown in wafer scale, which is 4× smaller than the actual mask size. This sidewall variation causes changes in diffraction from the mask. One possible effect is on shadowing. This type of mask feature causes shadow, but the non-vertical sidewalls will reduce the amount of shadow, particularly for off-axis illumination. This will make the feature appear to be smaller than the same feature with vertical sidewalls. The mask feature shown may be partitioned into an area image, two edge images and an E2E image. In one approach, the effects of non-vertical sidewalls may be accounted for by applying a spatial shift to the corresponding Edge and E2E filters. The area filter may or may not be affected, depending on whether the angled sidewall affects the total light reflection/transmission of the feature.

Figures 6A, 6B, 6C:
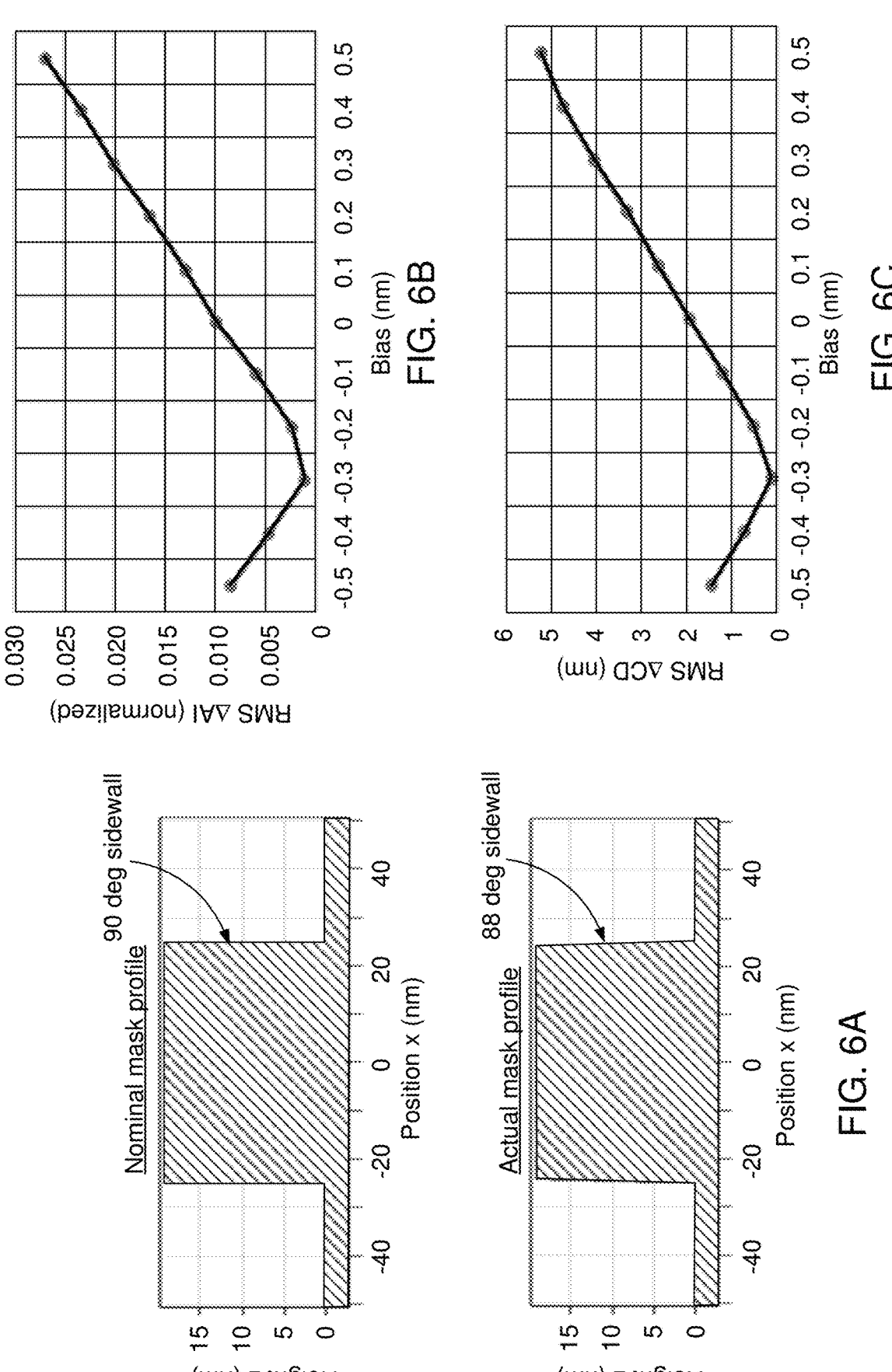
FIGS. 6A-6C depict adjusting M3D filters for variation in sidewall angle according to embodiments of the present disclosure.

FIGS. 6B and 6C show the effectiveness of this approach. In this example, the nominal mask feature has vertical sidewalls and the actual mask feature has sidewalls that are 2 degrees off vertical (88 degree angle). FIG. 6B plots the difference between aerial image (AI) predicted by a simulation of the 88 degree sidewall versus as predicted by the approach described herein. The x-axis is the spatial shift or bias b in nm, and the y-axis is the normalized RMS value of the difference between the aerial images. A bias of b=−0.3 nm yields good matching to the results predicted by the more rigorous simulation. The negative bias means that the absorber appears to be smaller than nominal, which is consistent with what is expected. FIG. 6C is a similar plot, but for the RMS value of the difference between the critical dimensions (CD). Again, a bias b=−0.3 nm yields good matching to the more rigorous simulation. A bias of b=0 corresponds to the prediction using uncorrected M3D filters.

FIGS. 7A-7C consider variations in the mask stack thickness. Mask features may be implemented as a stack of one or more materials of nominal thicknesses. The actual thicknesses may be greater or less than the nominal values. If the stack is absorptive, then thinner stacks may have a reduced shadowing effect and therefore appear smaller than the nominal version. The thickness variation can also impact the amplitude and phase of the overall transmission or reflection. These effects may be accounted for by shifting the Edge-based filter and also adjusting the Area filter.

FIGS. 7B and 7C are analogous to FIGS. 6B and 6C, but for thickness change. In this example, the nominal thickness is 76.5 nm and the actual thickness is 69 nm. Note that the z-axis in FIG. 7A is wafer scale which is 4× smaller than the mask scale, so the 76.5 nm mask will appear as 19.1 nm according to the z scale in FIG. 7A. FIGS. 7B and 7C plot the RMS values of the differences between aerial images and between critical dimensions, respectively, as a function of bias b. The corresponding M3D filters are adjusted in two ways. First, curves 720B and 720C show the difference metrics as a function of bias b. Second, a phase shift of −8.09 degrees is also applied to the area filter. Curves 730B and 730C plot the difference metrics as a function of bias b, including the phase shift of −8.09 degrees.

FIGS. 8A-8C consider variations in the material properties of the mask, such as index of refraction (n) and dielectric constant (k). These material properties are assumed to have certain nominal values, but the actual values in the fabricated mask may vary. If the stack is absorptive, then lower contrast materials (i.e., the difference in n or k between different materials is less than nominal), then the stack will have weaker diffraction and may appear smaller than the nominal version. These variations can also affect the amplitude and phase of the overall transmission or reflection. These effects may be accounted for by shifting the Edge-based filter and also adjusting the Area filter.

FIGS. 8B and 8C are analogous to FIGS. 7B and 7C, but for changes in index of refraction. In this example, the nominal index n=2.43 and the actual index n=2.3688. The corresponding M3D filters are adjusted as in FIG. 7. Curves 820B and 820C show the difference metrics as a function of bias b. Second, a phase shift of −8 degrees and amplitude scaling of 1.0063 are also applied to the Area filter. Curves 830B and 830C plot the difference metrics as a function of bias b with these additional adjustments.

As a final example, consider mask linearity effects or mask proximity effects. These deviations from nominal are caused by short range proximity effects and depend on the mask features. The fabrication of one mask feature may affect other mask features that are close. In one approach, these effects are accounted for by parameterized 3DM filters, but the parameters may be feature-dependent. For example, the bias b may be expressed as $$b = B + C \exp(-w/D) \qquad (8)$$

where B, C and D are constant parameters and w is the width of the feature. The bias b is feature-dependent. It is larger for narrower features and smaller for wider features.

Figure 9:
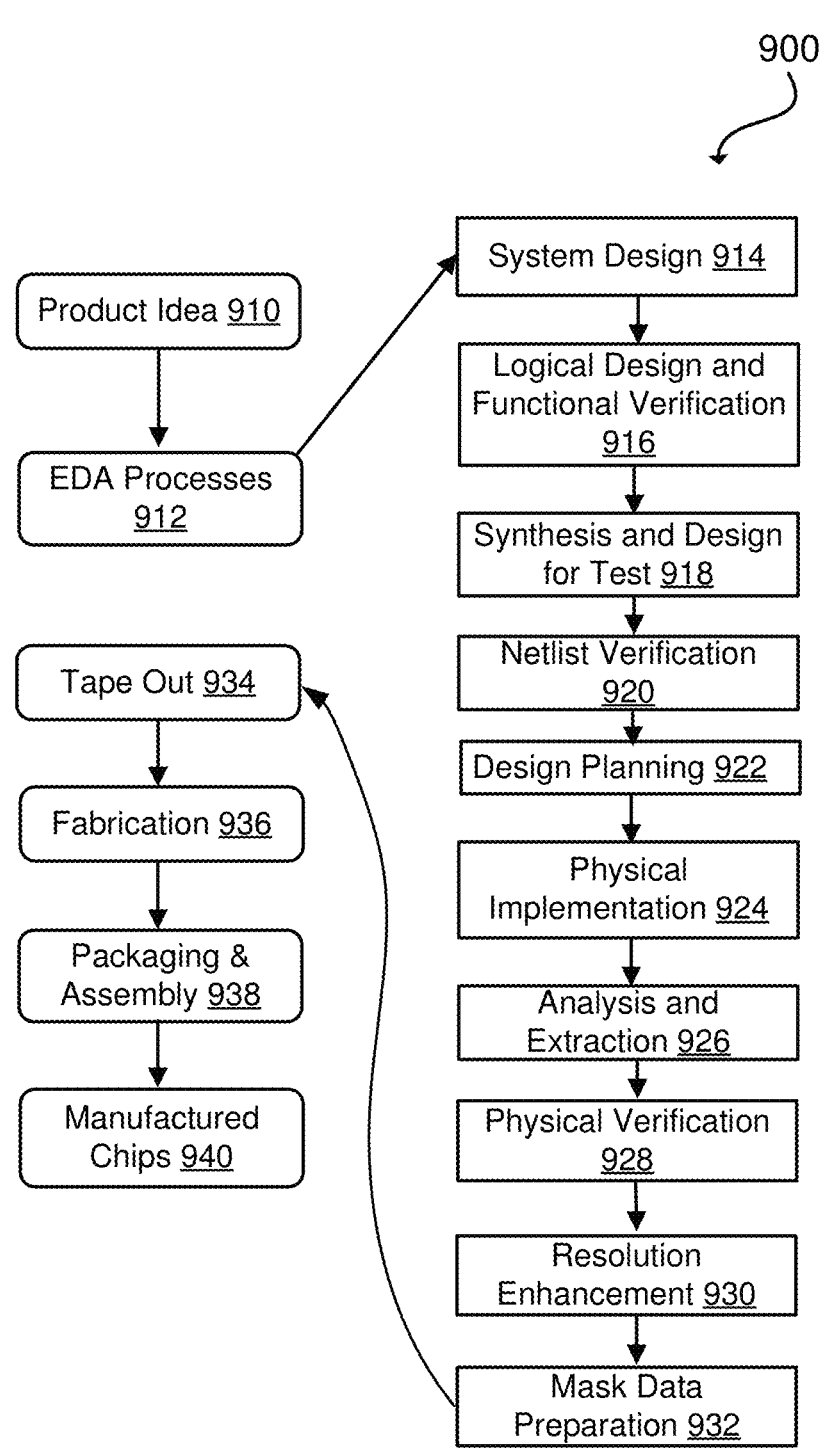
FIG. 9 depicts a flowchart of various processes used during the design and manufacture of an integrated circuit according to embodiments of the present disclosure.

FIG. 9 illustrates an example set of processes 900 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 910 with information supplied by a designer, information which is transformed to create an article of manufacture that uses a set of EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor die is fabricated 936 and packaging and assembly processes 938 are performed to produce the finished integrated circuit 940.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 9. The processes described by be enabled by EDA products (or EDA systems).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks. During mask data preparation 932, the 'tape-out' data is used to produce lithography masks that are used to produce finished integrated circuits.

A storage subsystem of a computer system (such as computer system 1000 of FIG. 10) may be used to store the programs and data structures that are used by some or all of the EDA products described herein, and products used for development of cells for the library and for physical and logical design that use the library.

Figure 10:
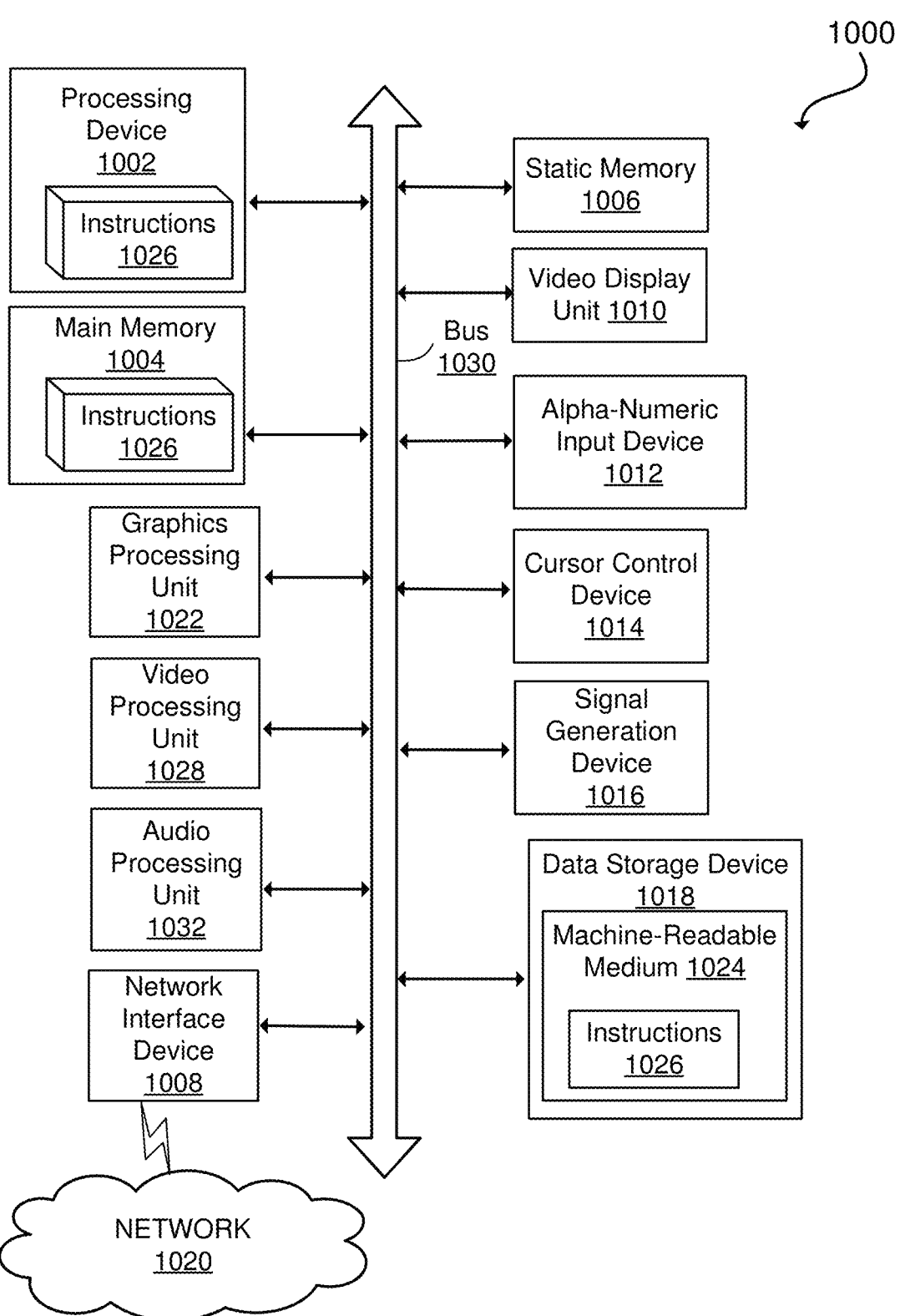
FIG. 10 depicts a diagram of an example computer system in which embodiments of the present disclosure may operate.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed)

network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:

receiving feature images that are images representing geometric features present in a layout geometry of a lithographic mask;

calculating, by a processor device, a mask function (MF) contribution from the feature images by convolving each feature image with a corresponding three-dimensional mask (M3D) filter; wherein the M3D filter represents an electromagnetic scattering effect of that feature image, and at least one M3D filter is a mask-corrected M3D filter that also accounts for effects arising from a mask fabrication process for the lithographic mask by applying a spatial shift, an additive constant or a multiplicative constant to an uncorrected version of the M3D filter.

2. The method of claim 1 wherein the mask-corrected M3D filter includes a parameter for the spatial shift, additive constant or multiplicative constant and the parameter of the mask-corrected M3D filter is tuned based on a measurement of a wafer fabricated using a lithographic mask that was fabricated using the mask fabrication process.

3. The method of claim 2 wherein the mask-corrected M3D filter is an area filter, and the parameter for the area filter is the additive constant or the multiplicative constant.

4. The method of claim 2 wherein the mask-corrected M3D filter is a single-edge filter, and the parameter for the single-edge filter is the spatial shift.

5. The method of claim 2 wherein the mask-corrected M3D filter is an edge-to-edge filter, and the parameter for the edge-to-edge filter is the spatial shift.

6. The method of claim 1 further comprising:

determining a mask function for the lithographic mask based on a combination of the calculated MF contributions;

using the mask function to estimate a result comprising an aerial image or a printed mask pattern produced by the lithographic mask; and applying a mask correction to a design of the lithographic mask based on the estimated result; wherein the mask correction comprises at least one of optical proximity correction, sub-resolution assist features, phase shifting masks, and inverse lithography techniques.

7. A non-transitory computer readable medium comprising stored instructions, which when executed by a processor device, cause the processor device to:

access uncorrected versions of mask 3D (M3D) filters corresponding to feature images; wherein the feature images are images that represent geometric features present in layout geometries of lithographic masks, and the uncorrected versions of the M3D filters represent an electromagnetic scattering effect of the feature images; and modifying, by a processor device, the uncorrected versions of the M3D filters to produce mask-corrected M3D filters that account for effects arising from the mask fabrication process for the lithographic mask by applying spatial shifts, additive constants and/or multiplicative constants to the uncorrected versions of the M3D filters.

8. The non-transitory computer readable medium of claim 7 wherein modifying the uncorrected versions of the M3D filters comprises:

accessing measurements of wafers fabricated using lithographic masks that were fabricated using the mask fabrication process; and modifying the uncorrected versions of the M3D filters based on the measurements of wafers.

9. The non-transitory computer readable medium of claim 8 wherein modifying the uncorrected versions of the M3D filters comprises: modifying the uncorrected versions of the M3D filters based on matching (a) results predicted by a simulation of wafers using candidate mask-corrected M3D filters; and (b) the measurements of wafers.

10. The non-transitory computer readable medium of claim 7 wherein modifying the uncorrected versions of the M3D filters comprises: modifying the uncorrected versions of the M3D filters based on matching (a) results predicted by a simulation of wafers using candidate mask-corrected M3D filters; and (b) results predicted by a simulation of wafers in which models for wafer structures include fabrication effects arising from the mask fabrication process.

11. The non-transitory computer readable medium of claim 7 wherein the lithographic mask includes a feature with a sidewall, the feature images representing the mask feature include a single-edge image and/or a multi-edge image, and modifying the uncorrected versions of the M3D filters comprises shifting the uncorrected versions of the M3D filter(s) for those feature image(s) to account for variation in an angle of the sidewall.

12. The non-transitory computer readable medium of claim 7 wherein the lithographic mask includes a film stack, the feature images representing the film stack include a single-edge image and/or a multi-edge image, and modifying the uncorrected versions of the M3D filters comprises shifting the uncorrected versions of the M3D filter(s) for those feature image(s) to account for variation in thickness of the film stack.

13. The non-transitory computer readable medium of claim 7 wherein the lithographic mask includes an absorber characterized by an index of refraction and a dielectric constant, the feature images representing the absorber include a single-edge image and/or a multi-edge image, and modifying the uncorrected versions of the M3D filters comprises shifting the uncorrected versions of the M3D filter(s) for those feature image(s) to account for variation in the index of refraction or dielectric constant.

14. The non-transitory computer readable medium of claim 7 wherein the feature images include a single-edge image and/or a multi-edge image, and modifying the uncorrected versions of the M3D filters comprises applying a feature-dependent shifting to the uncorrected versions of the M3D filter(s) for those feature image(s) to account for short range proximity effects in the fabrication process for the lithographic mask.

15. A system comprising:

a computer readable storage medium storing instructions and a library containing predefined feature images and corresponding precalculated mask 3D (M3D) filters; wherein the feature images are images that represent geometric features present in layout geometries of lithographic masks, the M3D filter represents an electromagnetic scattering effect of that feature image and at least one M3D filter is a mask-corrected M3D filter that also accounts for effects arising from a mask fabrication process for the lithographic mask by applying a spatial shift, an additive constant or a multiplicative constant to an uncorrected version of the M3D filter; and a processor device, coupled with the computer readable storage medium and to execute the instructions, the instructions when executed cause the processor device to:

partition a layout geometry of a lithographic mask into a plurality of feature images based on the predefined feature images contained in the library; and calculate mask function (MF) contributions from each of the plurality of feature images by convolving the feature image with the corresponding M3D filter from the library; and combine the calculated MF contributions to determine a mask function for the lithographic mask.

16. The system of claim 15 further comprising: applying the mask function as input to an Abbe imaging model or Hopkins imaging model.

17. The system of claim 15 wherein the layout geometry comprises a layout geometry for an entire integrated circuit die.

18. The system of claim 15 wherein a source illumination of the lithographic mask is an extreme ultraviolet (EUV) or deep ultraviolet (DUV) illumination.

19. The system of claim 15 wherein the layout geometry comprises a plurality of shapes, and the feature images representing each shape include not more than area images, single-edge images, and two-edge images.

* * * * *